(12) United States Patent
Wu

(10) Patent No.: US 6,363,839 B1
(45) Date of Patent: Apr. 2, 2002

(54) GRILL DEVICE WITH A CONNECTING UNIT FOR PREVENTING WOBBLING OF AN UPPER GRILL UNIT RELATIVE TO A LOWER GRILL UNIT DURING MOVEMENT FROM A CLOSED POSITION TO AN OPEN POSITION

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 09/960,576

(22) Filed: Sep. 20, 2001

(51) Int. Cl.[7] .............................. A47J 37/00; A47J 37/06
(52) U.S. Cl. .............................. 99/375; 99/379; 99/380; 99/400; 99/425; 99/445; 99/446
(58) Field of Search .................. 99/400, 401, 372–384, 99/425, 444–450; 219/401, 524, 585, 525, 537, 521, 415, 386, 494, 461, 492; 126/369, 20; 426/523, 520, 512; 100/92, 305

(56) References Cited

U.S. PATENT DOCUMENTS

| 4,088,067 A | * | 5/1978 | Kaebitzsch et al. ........... 99/379 |
| 4,178,500 A | * | 12/1979 | Brindopke ................... 219/524 |
| 5,363,748 A | * | 11/1994 | Boehm et al. ................. 99/372 |
| 5,606,905 A | * | 3/1997 | Boehm et al. ................. 99/375 |
| 5,845,562 A | * | 12/1998 | Deni et al. .................... 99/375 |
| 5,848,567 A | * | 12/1998 | Chiang .......................... 99/375 |
| 6,012,380 A | * | 1/2000 | Hermansson ............. 99/379 X |
| 6,170,389 B1 | * | 1/2001 | Brady ...................... 99/400 X |

* cited by examiner

Primary Examiner—Timothy F. Simone
(74) Attorney, Agent, or Firm—Brinks Hofer Gilson & Lione

(57) ABSTRACT

A grill device includes a horizontal upper grill unit with a rear side, a horizontal lower grill unit with a rear side, and a connecting unit. The upper grill unit is superposed on the lower grill unit. The connecting unit interconnects the rear sides of the upper and lower grill units in such a manner that the upper grill unit can be turned rearward from the lower grill unit to an open position. At the open position, the upper grill unit is prevented by the connecting unit from being moved to left and right sides of the lower grill unit.

3 Claims, 7 Drawing Sheets

GRILL DEVICE WITH A CONNECTING UNIT FOR PREVENTING WOBBLING OF AN UPPER GRILL UNIT RELATIVE TO A LOWER GRILL UNIT DURING MOVEMENT FROM A CLOSED POSITION TO AN OPEN POSITION

BACKGROUND OF THE INVENTION

1. Field of the Invention

The invention relates to a grill device, more particularly to a grill device with a connecting unit for preventing wobbling of an upper grill unit relative to a lower grill unit during movement from a closed position to an open position.

2. Description of the Related Art

Referring to FIG. 1, a conventional grill device 9 is shown to include a lower grill unit 91 with a rear side 913, an upper grill unit 92 with a rear side 923, and a connecting unit which interconnects the rear sides 923, 913 of the upper and lower grill units 92, 91 in such a manner that the upper grill unit 92 can be turned rearward relative to the lower grill unit 91 from a closed position to a horizontal fully open position, in which the upper and lower grill units 92, 91 are generally coplanar (not shown) and upper and lower cooking members 921, 911 of the grill units 92, 91 face upward, and a half-open position, in which a surface of the upper grill unit 92 abuts against a corner edge of the lower grill unit 91 so as to position the upper grill unit 92 on the lower grill unit 91, as best shown in FIG. 1.

As illustrated, the connecting unit includes a pivot seat 93 which is fixed on and which extends upwardly from the rear side 913 of the lower grill unit 91 and which has opposite left and right sides 930 formed with a pair of vertical slots 931, and left and right cylindrical pivots 924 which are fixed on the rear side 923 of the upper grill unit 92 and which extend laterally into the slots 931 in the lower grill unit 91. Under this condition, the upper grill unit 92 can be vertically raised along the slots 931 relative to the lower grill unit 1 by virtue of a piece of meat confined between the upper and lower grill units 92, 91 when the upper grill unit 92 is at the closed position.

Some disadvantages encountered during use of the aforesaid conventional grill device 9 are as follows:

1. When moving the upper grill unit 92 from the closed position to the half-open position, the upper grill unit 92 wobbles relative to the lower grill unit 91 in the vertical direction due to unrestricted movement of the pivots 924 in the slots 931.

2. In addition, the upper grill unit 92 also wobbles in left and right directions relative to the lower grill unit 91 since no movement-restricting member is provided between the upper and lower grill units 92,91.

SUMMARY OF THE INVENTION

The object of this invention is to provide a grill device with a connecting unit that can eliminate the occurrence of the aforesaid disadvantages which result during use of the conventional grill device.

Accordingly, a grill device of the present invention includes a horizontal upper grill unit with a rear side, a horizontal lower grill unit with a rear side, and a connecting unit. The upper grill unit is superposed on the lower grill unit, and has a bottom that is provided with an upper cooking member. The lower grill unit has a top that is provided with a lower cooking member. The connecting unit interconnects the rear sides of the upper and lower grill units in such a manner that the upper grill unit can be turned rearward from the lower grill unit to an open position, in which the upper and lower grill units are generally perpendicular to each other. The connecting unit includes a pair of spaced apart left and right pivot seats, an intermediate pivot seat, and left and right cylindrical pivots. The left and right pivot seats are fixed on and extend upward from the rear side of the lower grill unit. The intermediate pivot seat is fixed on and extends upwardly from the rear side of the lower grill unit between the left and right pivot seats. Left and right sides of the intermediate pivot seat are formed with a pair of vertical slots. The left and right cylindrical pivots are fixed on the rear side of the upper grill unit between the left and right pivots, and extend laterally into the slots in the intermediate pivot seat, thereby strengthening pivotal coupling between the upper grill unit and the lower grill unit. The intermediate pivot seat further has a front curved wall between the left and right sides, and a limiting member which is fixed on the intermediate pivot seat and which has two parallel curved guide rails surrounding the front curved wall. The rear side of the upper grill unit has a pair of spaced apart limiting holes that permit the curved guide rails to extend fittingly therethrough so as to be turnable therealong and so as to enable smooth rotation of the cylindrical pivots within the slots in the intermediate pivot seat, thereby preventing left and right movement of the upper grill unit relative to the lower grill unit during rotation of the cylindrical pivots within the slots in the intermediate pivot seat.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
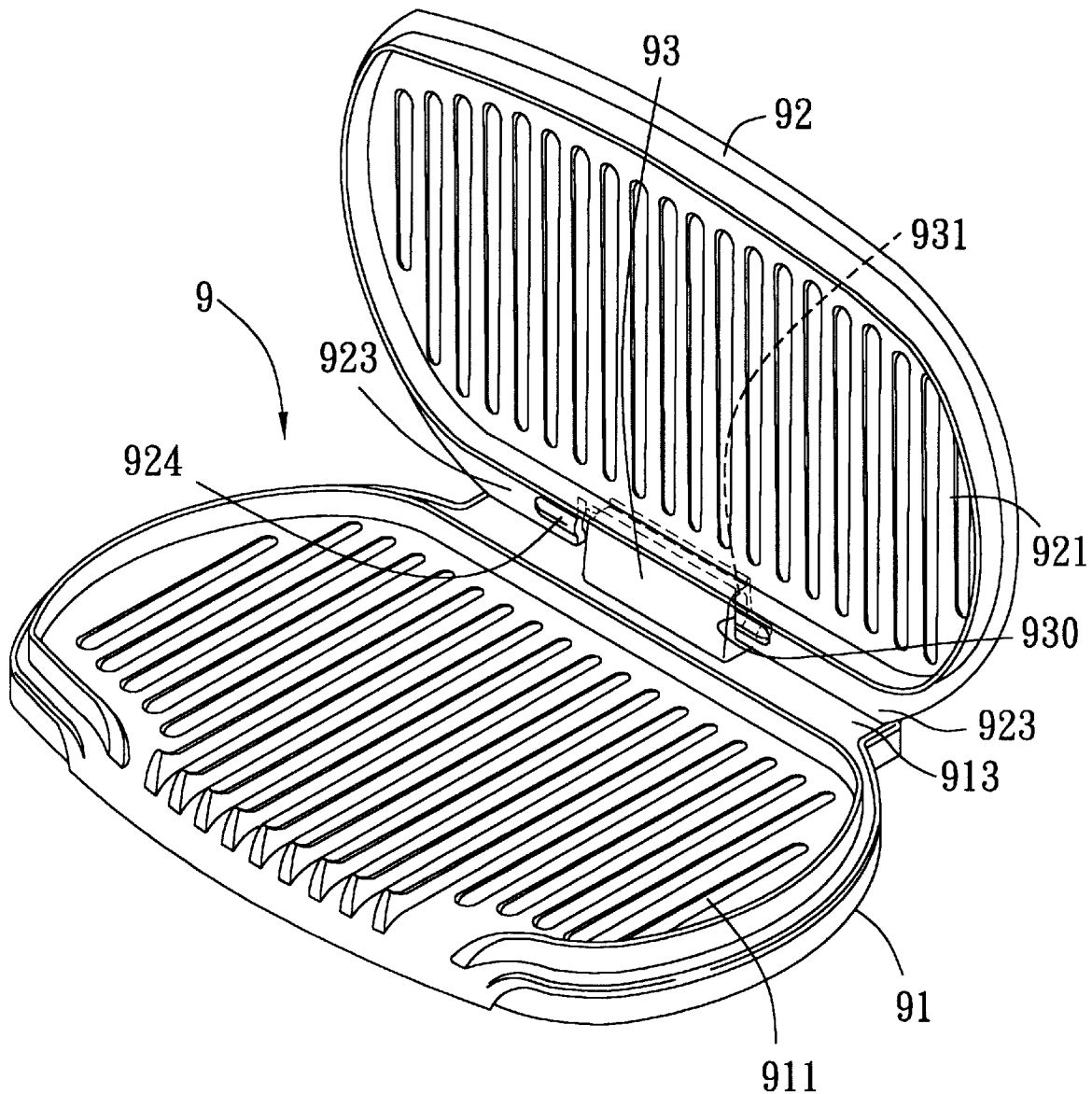
FIG. 1 is a perspective view of a conventional grill device at an open position.
Figure 2:
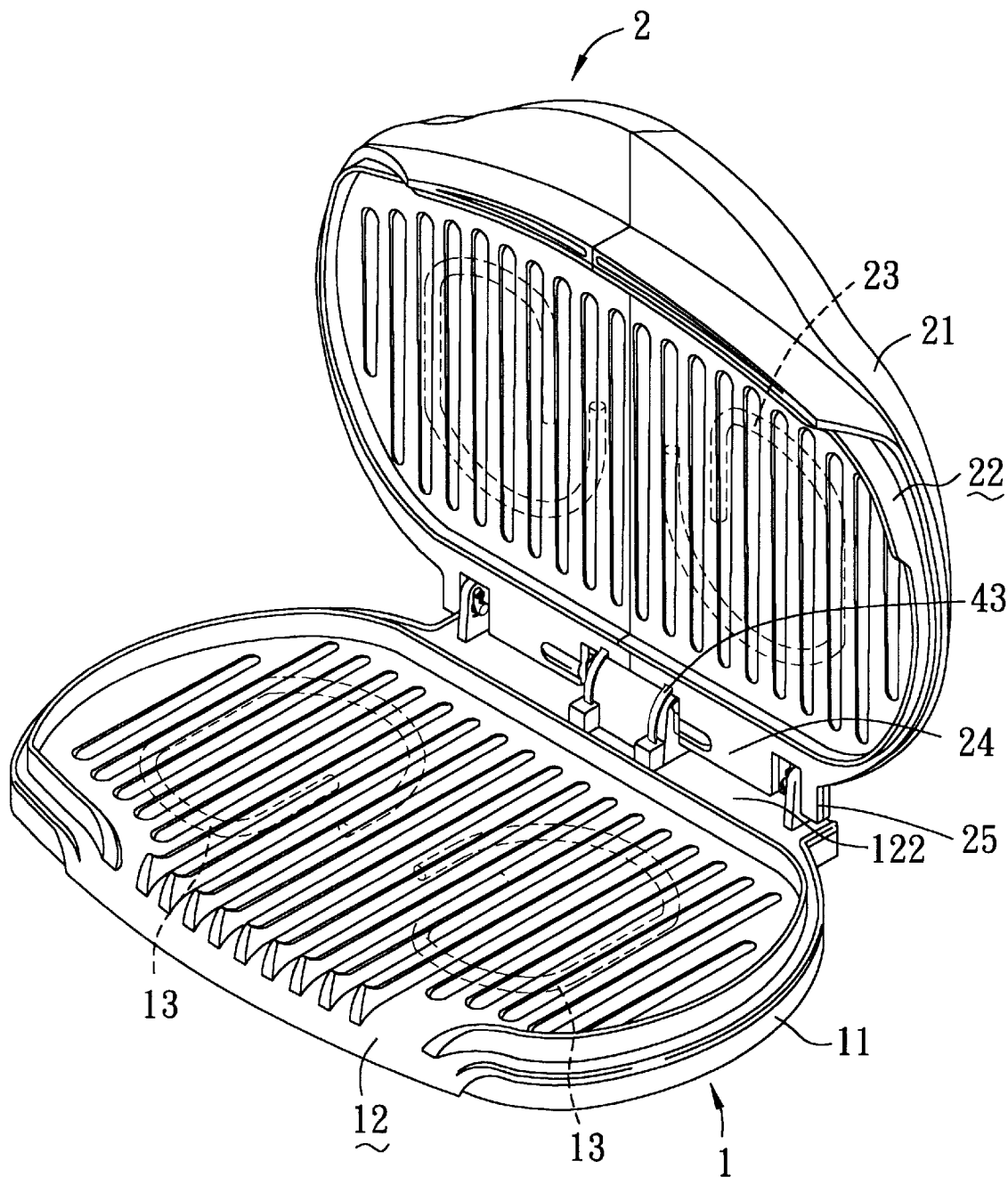
FIG. 2 is a perspective view of the preferred embodiment of a grill device of the present invention at an open position.
Figure 3:
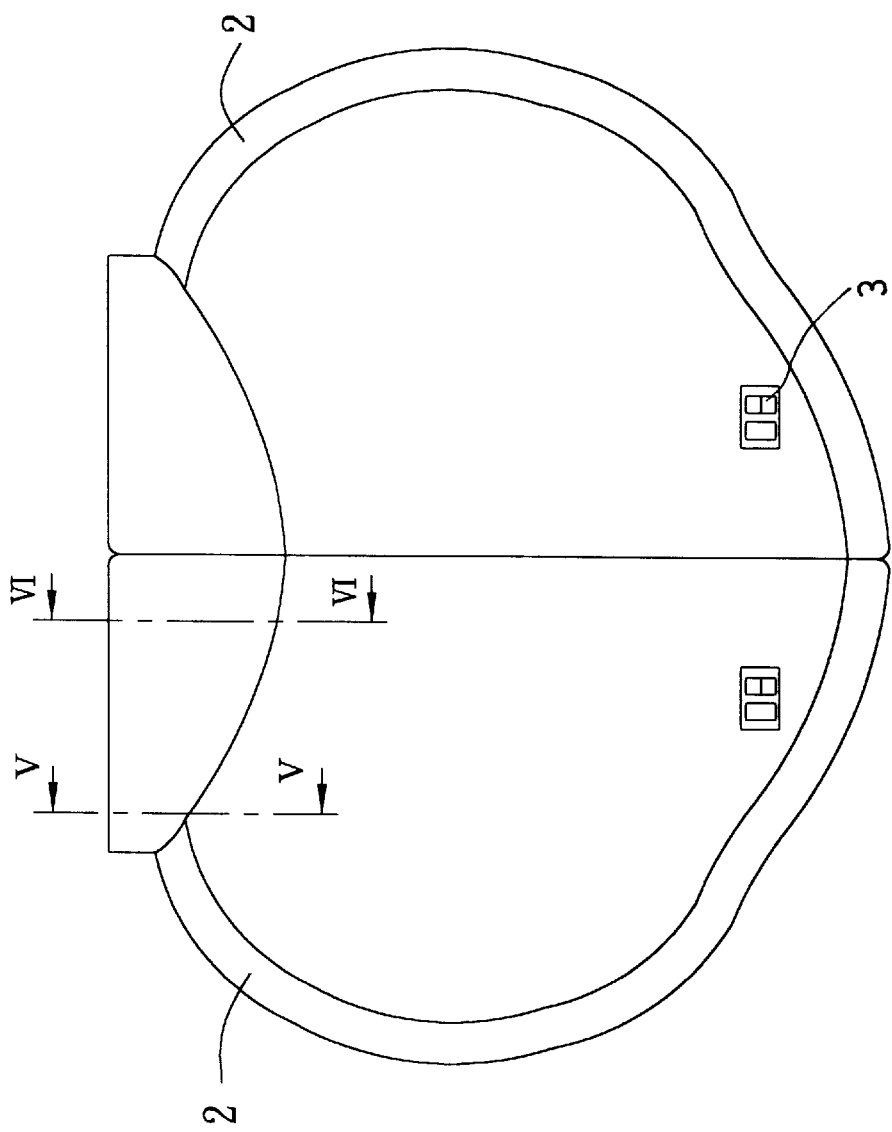
FIG. 3 is a top side view of the preferred embodiment at a closed position.
Figure 4:
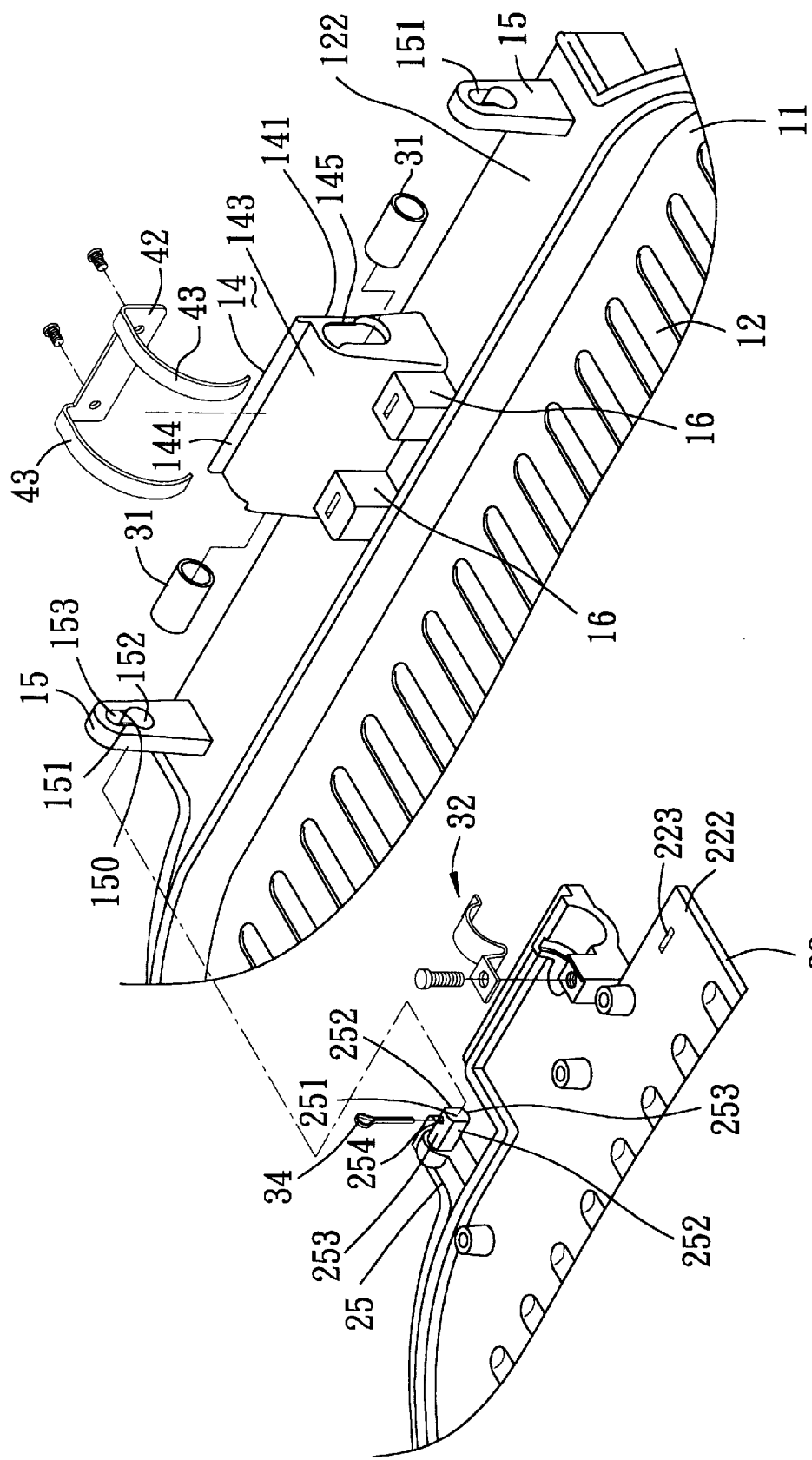
FIG. 4 is a fragmentary exploded perspective view of the preferred embodiment, illustrating how upper and lower grill units are connected to each other.

Referring to FIGS. 2 to 4, the preferred embodiment of a grill device 1 of this invention is shown to include a horizontal upper grill unit 21 with a rear side 25, a horizontal lower grill unit 11 with a rear side 122, and a connecting unit.

As illustrated, the upper grill unit 21 is superposed on the lower grill unit 11, as best shown in FIG. 3, so as to dispose the upper grill unit 21 at a closed position with respect to the lower grill unit 11. The upper grill unit 21 has a bottom 22 that is provided with two upper cooking members 23.

The lower grill unit 11 has a top 12 that is provided with two lower cooking members 13.

The connecting unit interconnects the rear sides 25, 122 of the upper and lower grill units 21, 11 in such a manner that the upper grill unit 21 can be turned rearward from the lower grill unit 11 to an open position, in which the upper and lower grill units 21, 11 are generally perpendicular to each other, as best shown in FIG. 2, the consequence of which will be detailed in the succeeding paragraphs.

Figure 5A:
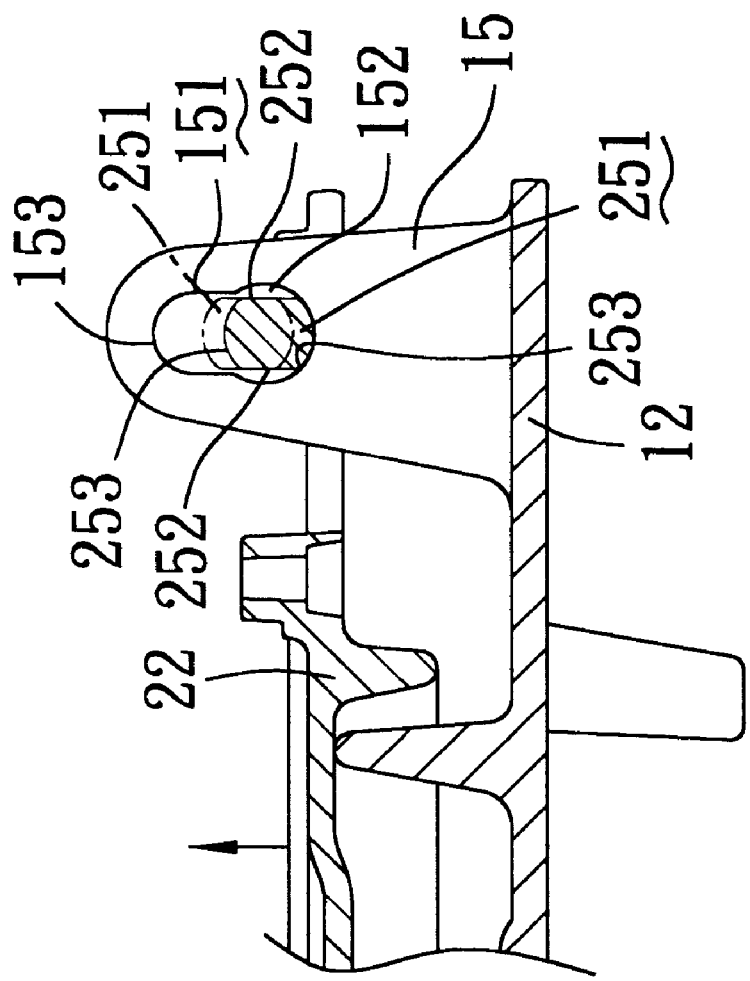
FIGS. 5A and 5B are fragmentary schematic views of the preferred embodiment taken along lines V—V in FIG. 3, a rear part of which is partly sectioned to illustrate how the upper and lower grill units are connected to each other.
Figure 5B:
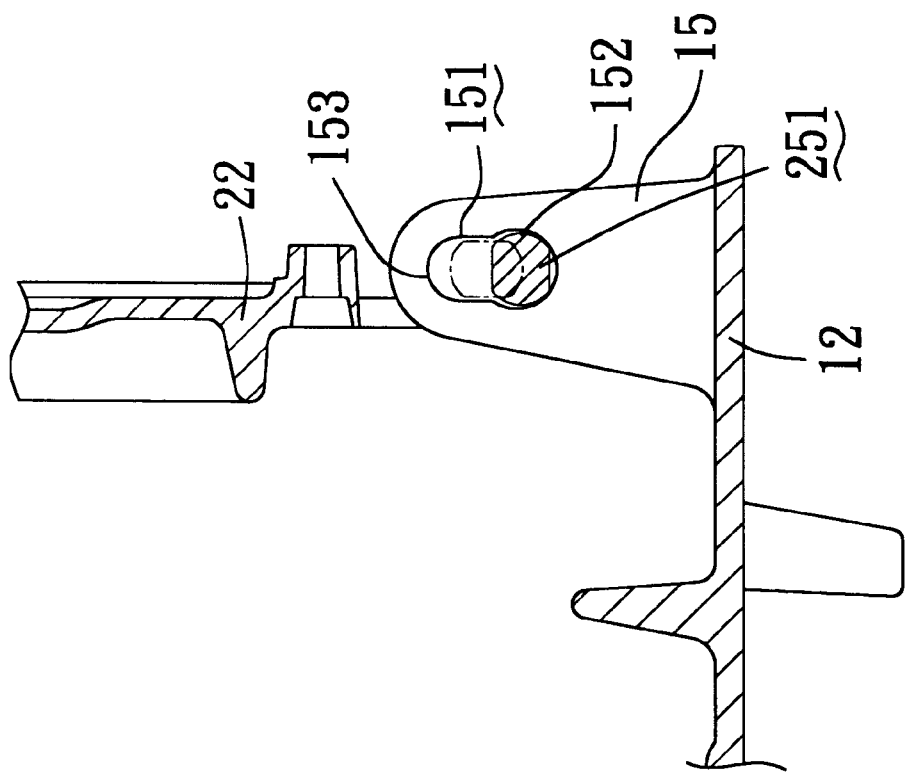

The connecting unit includes a pair of spaced apart left and right pivot seats 15, and a pair of aligned left and right pivots 251. The left and right pivot seats 15 are fixed on and extend upward from the rear side 122 of the lower grill unit 11. Each of the left and right pivot seats 15 has a vertical pivot slot 151 that is defined by a slot face 150 and that has a circular lower space 152 and a reduced upper space 153 which is reduced and which extends upward from the lower space 152. The slot face 150 has two opposing flat sides that confine two opposing sides of the upper space 153 and that define a first width therebetween. The left and right pivots 251 are fixed on the rear side 25 of the upper grill unit 21, and extend into the lower spaces 152 of the slots 151 in the lower grill unit 11. Each of the left and right pivots 251 has a pair of diametrically disposed front and rear flat sides 252 which extend generally parallel to the flat sides of the upper space 153 of the respective slot 151 when the upper grill unit 11 is disposed at the closed position of FIG. 3 and which define therebetween a second width that is slightly smaller than the first width so as to permit extension of a respective one of the pivots 251 into the upper space 153 of the respective slot 151 in case the upper grill unit 22 is raised vertically relative to the lower grill unit 1, as best shown in FIG. 5A, by virtue of a piece of meat (not shown) that is confined between the upper and lower grill units 22,11. Each of the left and right pivots 251 further has a pair of diametrically disposed curved sides 253 which interconnect the front and rear flat sides 252 and which define therebetween a diameter that is slightly larger than the first width and that is transverse and spans the first width so as to prevent extension of the respective one of the pivots 251 into the upper space 153 of the respective slot 151 when the upper grill unit 1 is disposed at the open position, as best shown in FIGS. 2 and 5B.

Figure 7:
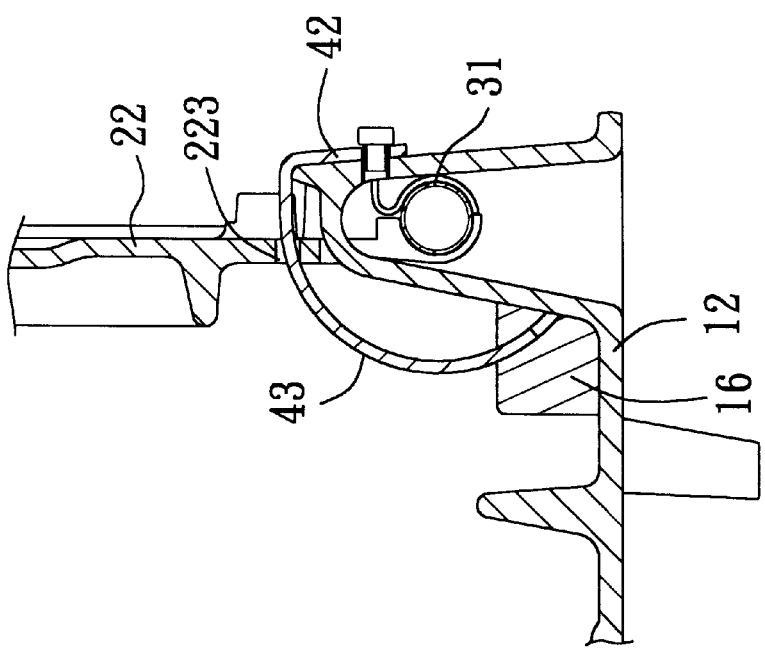
FIG. 7 is a fragmentary and sectional rear view of the preferred embodiment when the upper grill unit is disposed at the open position, illustrating how the upper grill unit is prevented from being moved to left and right sides of the lower grill unit by virtue of a limiting member disposed between the upper and lower grill units.
Figure 6:
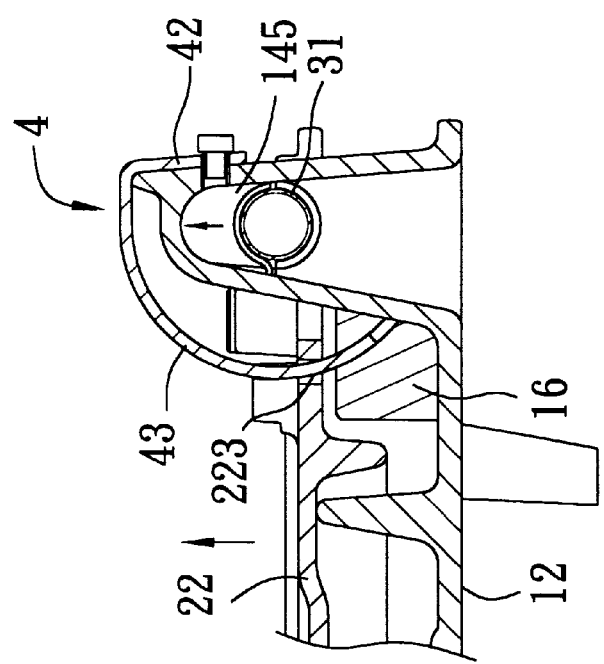
FIG. 6 is a fragmentary schematic view of the preferred embodiment taken along lines VI—VI in FIG. 3, a rear part of which is sectioned to illustrate how the upper grill unit is raised relative to the lower grill unit.

Referring to FIGS. 4, 6 and 7, the connecting unit further includes an intermediate pivot seat 14 which is fixed on and which extends upwardly from the rear side 122 of the lower grill unit 11 between the left and right pivot seats 15 and which has opposing left and right sides 141 formed with a pair of vertical slots 145, and left and right cylindrical pivots 31 which are fixed on the rear side 25 of the upper grill unit 22 between the left and right pivots 15 and which extend laterally into the slots 145 in the intermediate pivot seat 14, thereby strengthening pivotal coupling between the upper grill unit 22 and the lower grill unit 11. Preferably, the intermediate pivot seat 14 has a front curved wall 143 between the left and right sides 141, and a limiting member 42 that is fixed on the intermediate pivot seat 14 and that has two parallel curved guide rails 43. The parallel curved guide rails 43 are held between a top flange 144 that is integrally formed with the pivot seat 14 and two retention studs 16 that are disposed fixedly on the rear side 122 of the lower grill unit 11 adjacent to the front curved wall 143 in such a manner that the guide rails 43 surround the front curved wall 143. An intermediate section 222 of the rear side 25 of the upper grill units 22 has a pair of spaced apart limiting holes 223 that permit the curved guide rails 43 to extend fittingly therethrough so as to be turnable therealong and so as to enable smooth rotation of the cylindrical pivots 31 within the slots 145, thereby preventing left and right movement of the upper grill unit 22 relative to the lower grill unit 11 during rotation of the cylindrical pivots 31 within the slots 145. Two fastener pins 34 are inserted through holes 254 in the pivots 251 so as to prevent untimely removal of the upper grill unit 22 from the lower grill unit 11.

Preferably, the lower grill unit 11 is provided with two lower cooking members 13. The upper grill unit 22 is constructed into two independent upper halves 2 (see FIGS. 2 and 3) which are superposed on the lower grill unit 11. Each of the upper halves 2 is provided with an upper cooking member 23 which is registered with and which is electrically coupled to a respective one of the lower cooking members 13 of the lower grill unit 11. Each of the upper halves 2 is pivoted to a respective one of the pivot seats 15 and a respective one of the opposite sides of the intermediate pivot seat 14. A pair of control switches 3 (see FIG. 3) are provided, each of which is operable so as to control actuation and cooking temperature of a respective one of the lower cooking members 13 of the lower grill unit 11 and the upper cooking member 23 of a corresponding one of the upper halves 2. Under this condition, each of the upper halves 2 is individually turnable relative to the lower grill unit 11 without wobbling thereof.

With this invention thus explained, it is apparent that numerous modifications and variations can be made without departing from the scope and spirit of this invention. It is therefore intended that this invention be limited only as indicated in the appended claims.

I claim:

1. A grill device comprising:

a horizontal lower grill unit having a rear side and a top that is provided with a lower cooking member;

a horizontal upper grill unit superposed on said lower grill unit so as to dispose said upper grill unit at a closed position with respect to said lower grill unit, said upper grill unit having a rear side and a bottom that is provided with an upper cooking member; and a connecting unit interconnecting said rear sides of said upper and lower grill units in such a manner that said upper grill unit can be turned rearward from said closed position to an open position, in which said upper and lower grill units are generally perpendicular to each other, said connecting unit including a pair of spaced apart left and right pivot seats fixed on and extending upward from said rear side of said lower grill unit, an intermediate pivot seat which is fixed on and which extends upwardly from said rear side of said lower grill unit between said left and right pivot seats and which has left and right sides formed with a pair of vertical slots, and left and right cylindrical pivots which are fixed on said rear side of said upper grill unit between said left and right pivots and which extend laterally into said slots in said intermediate pivot seat, thereby strengthening pivotal coupling between said upper grill unit and said lower grill unit, said intermediate pivot seat further having a front curved wall between said left and right sides, and a limiting member which is fixed on said intermediate pivot seat and which has two parallel curved guide rails surrounding said front curved wall, said rear side of said upper grill unit further having a pair of spaced apart limiting holes that permit said curved guide rails to extend fittingly therethrough so as to be turnable therealong and so as to enable smooth rotation of said cylindrical pivots within said slots in said intermediate pivot seat, thereby preventing left and right movement of said upper grill unit relative to said lower grill unit during rotation of said cylindrical pivots within said slots in said intermediate pivot seat.

2. The grill device as defined in claim 1, wherein each of said left and right pivot seats has a vertical pivot slot that is defined by a slot face and that has a circular lower space and a reduced upper space which is reduced and which extends upward from said lower space, said slot face having two opposing flat sides that confine two opposing sides of said upper space and that define a first width therebetween, said grill device further comprising a pair of aligned left and right pivots fixed on said rear side of said upper grill unit and laterally extending into said lower spaces of said slots in said lower grill unit, each of said left and right pivots having a pair of diametrically disposed front and rear flat sides which extend generally parallel to said flat sides of said upper space of the respective one of said slots when said upper grill unit is disposed at said closed position and which define therebetween a second width that is slightly smaller than said first width so as to permit extension of a respective one of said pivots into said upper space of the respective one of said slots in case said upper grill unit is raised vertically relative to said lower grill unit by virtue of a piece of meat confined between said upper and lower grill units when said upper grill unit is disposed at said closed position, each of said left and right pivots further having a pair of diametrically disposed curved sides which interconnect said front and rear flat sides and which define therebetween a diameter that is slightly larger than said first width and that is transverse and spans said first width so as to prevent extension of the respective one of said pivots into said upper space of the respective one of said slots when said upper grill unit is disposed at said open position.

3. The grill device as defined in claim 2, wherein said lower grill unit is provided with two of said lower cooking members, said upper grill unit being divided into two independent upper halves, each of said upper halves being provided with said upper cooking member which is registered with and which is electrically coupled to a respective one of the lower cooking members of the lower grill unit, each of said upper halves being pivoted to a respective one of the pivot seats and a respective one of said opposite sides of said intermediate pivot seat.

* * * * *